(12) United States Patent
Keyvani et al.

(10) Patent No.: US 7,550,065 B2
(45) Date of Patent: *Jun. 23, 2009

(54) METHOD FOR RECOVERING SOLVENTS

(75) Inventors: Majid Keyvani, Glen Mills, PA (US);
Jude T. Ruszkay, Coatesville, PA (US);
Edward P. Carey, Atglen, PA (US)

(73) Assignee: Lyondell Chemical Technology, L.P., Greenville, DE (US)

( * ) Notice: Subject to any disclaimer, the term of this patent is extended or adjusted under 35 U.S.C. 154(b) by 709 days.

This patent is subject to a terminal disclaimer.

(21) Appl. No.: 11/111,572

(22) Filed: Apr. 21, 2005

(65) Prior Publication Data

US 2006/0237299 A1    Oct. 26, 2006

(51) Int. Cl.
*B01D 3/34* (2006.01)
*C07C 7/05* (2006.01)

(52) U.S. Cl. .......................... 203/52; 203/69; 585/867

(58) Field of Classification Search ............... 203/6, 203/52, 57, 68, 69; 568/305, 324, 913; 525/74, 525/78; 585/803, 804, 805, 807, 867
See application file for complete search history.

(56) References Cited

U.S. PATENT DOCUMENTS

| 3,855,078 | A | * | 12/1974 | Friedrich et al. | 203/37 |
| 4,353,784 | A | * | 10/1982 | Koga et al. | 203/16 |
| 4,774,144 | A |  | 9/1988 | Jachec et al. | 428/461 |
| 4,842,947 | A |  | 6/1989 | Jachec et al. | 428/461 |
| 5,091,478 | A | * | 2/1992 | Saltman | 525/179 |
| 5,288,811 | A | * | 2/1994 | Brois | 525/383 |
| 5,336,721 | A |  | 8/1994 | Kiang | 525/78 |
| 5,367,022 | A |  | 11/1994 | Kiang et al. | 525/74 |
| 5,439,974 | A |  | 8/1995 | Mattson | 525/74 |
| 7,060,787 | B2 | * | 6/2006 | Gupta et al. | 528/480 |

FOREIGN PATENT DOCUMENTS

| JP | 2185505 |   | 7/1990 |
| JP | 4202202 |   | 7/1992 |
| JP | 06025580 | * | 2/1994 |

OTHER PUBLICATIONS

Coulson et al , "Chemical Engineering" vol. Two, Unit Operations , Third Ed. , 1977, p. 412.*

* cited by examiner

*Primary Examiner*—Virginia Manoharan
(74) *Attorney, Agent, or Firm*—Shao-Hua Guo

(57) ABSTRACT

A method for recovering a solvent from its mixture containing oligomers extracted from grafted polyolefins is disclosed. The method includes distilling the solvent from the mixture in the presence of a naphthalene compound. The method of the invention significantly increases the solvent recovering yield without causing the vessel fouling.

15 Claims, No Drawings

METHOD FOR RECOVERING SOLVENTS

FIELD OF THE INVENTION

The invention relates to recovering a solvent from its mixture with oligomers extracted from grafted polyolefins.

BACKGROUND OF THE INVENTION

Grafted polyolefins are especially useful as blend components because they can impart adhesion to the blend. For example, U.S. Pat. Nos. 4,774,144, 4,842,947, 5,336,721, and 5,439,974 describe several blends employing graft polyolefins. Unreacted grafting monomers and oligomers often need to be removed from the grafted polyolefin products because these impurities can have deleterious effects on color, adhesion, and film clarity.

Methods for removing oligomers from grafted polyolefins are known. For instance, Japanese Pat. No. 2185505 teaches immersing molten grafted polyolefin in a carbonyl containing solvent such as methyl ethyl ketone to remove the unreacted monomers and oligomers. Japanese Pat. No. 4202202 teaches extracting oligomers from grafted polyolefin by refluxing, through the polymer, a mixture of toluene and methyl ethyl ketone, followed by rinsing with acetone.

Copending application Ser. No. 10/846,735, filed May 14, 2004, teaches extracting the unreacted monomers and oligomers from the grafted polyolefin with azeotropic solvent mixtures.

It is of great advantage to be able to economically recover these solvents. One challenge in recovering the solvents is that at the end of distillation the oligomers are concentrated in the bottoms and can cause fouling. To overcome this problem, a relatively large amount of solvent often needs to remain with the oligomers; the mixture is often treated as a waste stream. Incomplete recovery of the solvents not only leads to poor economics but also to a waste disposal problem.

Hence, a new method is needed for more efficiently recovering the solvents. Ideally, the method would be performed without increasing the operational cost.

SUMMARY OF THE INVENTION

The invention is a method for recovering a solvent from a mixture of the solvent and oligomers extracted from a grafted polyolefin. The method comprises distilling the solvent from the mixture in the presence of a naphthalene compound. By "naphthalene compound," we mean to include naphthalene, its derivatives, and mixtures thereof. Naphthalene derivatives include substituted naphthalenes and hydrogenated naphthalenes. The method of the invention significantly reduces the amount of solvent which otherwise necessarily remains in the oligomers.

DETAILED DESCRIPTION OF THE INVENTION

The invention is a method for recovering a solvent from a mixture of the solvent and oligomers extracted from a grafted polyolefin. By "polyolefins," we mean homopolymers and copolymers of ethylene and α-olefins, preferably $C_3$-$C_{20}$ α-olefins. Examples of suitable α-olefins are propylene, 1-butene, 1-hexene, 1-octene, the like, and mixtures thereof. Examples of polyolefins include high density, low density, and medium density polyethylenes, propylene homopolymers, random copolymers, and impact copolymers, ethylene-propylene rubber, and ethylene-propylene-diene copolymers (EPDM).

By "grafted," we mean that the polyolefin is grafted with a grafting monomer. Examples of grafting monomers include vinyl silanes, dienes, vinyl aromatics, vinyl ethers and esters, allylic alcohols, alkoxylated allylic alcohols, unsaturated carboxylic acids and derivatives, the like, and mixtures thereof. Examples of unsaturated carboxylic acids and derivatives include acrylic acid, methacrylic acid, alkyl acrylates and methacrylates, maleic acid and anhydride, the like, and mixtures thereof.

Grafted polyolefins are often produced by extrusion process in which a melt polyolefin is mixed and reacts with a grafting monomer and a free radical initiator such as peroxides and azo compounds. For instance, U.S. Pat. No. 5,367,022 teaches grafting maleic anhydride onto polypropylene. Grafting process produces oligomers which may or may not be grafted. The oligomers reduce the performance of the grafted polyolefin products and they are thus removed, for example, by extraction with a solvent. Besides oligomers, the solvent also extracts other impurities such as unreacted monomers and free radical initiator residues and decomposition products.

Suitable solvents include $C_5$-$C_8$ hydrocarbon, $C_1$-$C_{10}$ oxygen-containing compounds, and mixtures thereof. Preferred $C_5$-$C_8$ hydrocarbons include hexane, heptane, 2,5-dimethylhexane, cyclohexane, toluene, xylenes, the like, and mixtures thereof. Preferred $C_1$-$C_{10}$ oxygen-containing compounds include aliphatic alcohols such as methanol, ethanol, and isopropyl alcohol, ketones such as acetone and methyl ethyl ketone, and esters such as methyl acetate, ethyl acetate, propyl acetate, isopropyl acetate, t-butyl acetate, ethyl propionate, and propyl formate. More preferably, the $C_1$-$C_{10}$ oxygen-containing compounds are alkyl acetates such as methyl acetate, ethyl acetate, propyl acetate, t-butyl acetate, and isopropyl acetate.

The amount of solvent used in the extraction can be as much as eight times of the grafted polyolefin. The solvents are usually recovered by distillation and the oligomers are treated as a waste stream. In the conventional process, the solvents can usually be recovered by less than 80%. A significant amount of solvent remains with the oligomers, otherwise the oligomers build up in the vessel causing fouling. The solvents are often expensive. Plus, a large amount of solvent remaining in the oligomers makes the waste disposal inconvenient and unsafe.

The method of the invention recovers the solvent by distillation in the presence of a naphthalene compound. We surprisingly found that adding a naphthalene compound to the distillation significantly reduces the amount of the extraction solvent remaining with the oligomers and significantly reduces the amount of solvent required to avoid vessel fouling. Preferably, the method of the invention recovers greater than 80% of the solvent from its mixture with the oligomers. More preferably, the method of the invention recovers more than 90% of the solvent from its mixture with the oligomers. Most preferably, the method of the invention recovers more than 95% of the solvent from its mixture with the oligomers.

Suitable naphthalene compounds include naphthalene and its derivatives. Naphthalene derivatives include substituted and hydrogenated naphthalenes. Preferably, the naphthalene compound is selected from the group consisting of naphthalene, alkylnaphthalenes, and mixtures thereof. Preferred alkylnaphthalenes include 1-methyinaphthalene, 2-methylnaphthalene, 1-ethylnaphthalene, 2-ethylnaphthalene, the like, and mixtures thereof. Most preferred naphthalene compounds are mixtures of naphthalene and methylnaphthalenes, for instance, Advasol®150, a product of Advanced Aromatics, L.P. The naphthalene compounds are less expensive and safer to handle when they remain with the oligomer waste stream.

Amount of naphthalene compound used depends on many factors including the type and amount of oligomers, the type of grafted polyolefin, the type of the solvent, and the type of naphthalene compound. Preferably, the naphthalene compound is used in an amount from about 5 wt % to about 50 wt % of the solvent. More preferably, the amount of naphthalene compound is from 5 wt % to about 20 wt % of the solvent. The naphthalene compound may remain with or be removed from the oligomers. Naphthalene compounds are often less expensive than the solvents used for extracting the oligomers. Further, the naphthalene compounds have high flash points and thus they are safer to handle than the extraction solvents. Thus, when the naphthalene compounds remain with the oligomers, the oligomer waste stream is easy and safe to handle.

The following examples merely illustrate the invention. Those skilled in the art will recognize many variations that are within the spirit of the invention and the scope of the claims.

EXAMPLE 1

Extraction of Oligomers from Grafted Polyolefin

Maleic anhydride-grafted polypropylene pellets (100 parts by weight, prepared according to the general procedure of U.S. Pat. No. 5,367,022) is charged to a column. The grafted polypropylene is extracted by flushing 400 parts by weight of an azeotropic solvent (62 wt % of hexane and 38 wt % of ethyl acetate) through the column for six hours. The pellets are then washed with fresh solvent (400 parts by weight, 62 wt % of hexane and 38 wt % of ethyl acetate) at ambient temperature for thirty minutes. Two extracted solutions are mixed; the mixture contains about 1.5 wt % of oligomers and other impurities.

EXAMPLE 2

Distillation in the Presence of Naphthalene Compound

One hundred parts by weight of the above solution mixture are mixed with 50, 30, 20, 10, and 5 parts by weight of a naphthalene compound (Advasol 150, a mixture of naphthalene and methylnaphthalenes, product of Advanced Aromatics, L.P.), respectively. The naphthalene compound has a boiling point range: initial boiling point 403° F., boiling point at 20% 449° F., and ending boiling point 682° F.; flash point −24° C.; solvency (Kauri-butanol number) 29.0; and total vol. % of aromatics 96.0%. The mixtures are distilled to recover hexane and ethyl acetate. We found that when the naphthalene compound is present in 5 parts, the hexane and ethyl acetate recovery can reach about 95% without solid precipitation and vessel fouling. However, when the solvent recovery is greater than 95%, the solid precipitation and vessel fouling occur. When the naphthalene compound is present 10, 20, 30, and 50 parts, respectively, the solvent recovery can reach as high as 99% without solid precipitation and vessel fouling.

COMPARATIVE EXAMPLE 3

Distillation in the Absence of Naphthalene Compound

Comparative Example 3 is performed under the same conditions as Example 2, but in the absence of naphthalene compound. The solvent recovery can reach about 75% without solid precipitation and vessel fouling. However, the solid precipitation and vessel fouling start to occur when the solvent recovery is greater than 75%.

COMPARATIVE EXAMPLE 4

Distillation in the Presence of Benzene Compound

Comparative Example 4 is performed under the same conditions as Example 2, but the naphthalene compound is substituted by a benzene compound. The benzene compound has similar physical properties to those of the naphthalene compound. It has a boiling point rage: initial boiling point 357° F., boiling point at 20% 432° F., and ending boiling point 658° F.; flash point −60° C.; solvency (Kauri-butanol number) 98.9; and total vol. % of aromatics 98.9%. In Comparative Example 4, the solid precipitation and vessel fouling occur when the solvent recovery reaches above 75%.

We claim:

1. A method for recovering a solvent, said method comprising distilling the solvent, in the presence of a naphthalene compound in an amount from about 5 wt % to about 50 wt % of the solvent, from a mixture comprising the solvent and oligomers extracted from a grafted polyolefin.

2. The method of claim 1 wherein the naphthalene compound is an alkylnaphthalene.

3. The method of claim 2 wherein the alkylnaphthalene is selected from the group consisting of 1-methylnaphthalene, 2-methylnaphthalene, 1-ethylnaphthalene, 2-ethylnaphthalene, and mixtures thereof.

4. The method of claim 1 wherein the naphthalene compound is a mixture of naphthalene and methylnaphthalenes.

5. The method of claim 1 wherein the grafted polyolefin is a maleic anhydride-grafted polyolefin.

6. The method of claim 1 wherein the grafted polyolefin is a maleic anhydride-grafted propylene homopolymer.

7. The method of claim 1 wherein the grafted polyolefin is a maleic anhydride-grafted impact polypropylene.

8. The method of claim 1 wherein the solvent is selected from the group consisting of $C_5$-$C_8$ hydrocarbons, $C_1$-$C_{10}$ oxygen-containing compounds, and mixtures thereof.

9. The method of claim 8 wherein the $C_1$-$C_{10}$ oxygen-containing compound is selected from the group consisting of alcohols, aliphatic ketones, aliphatic esters, and mixtures thereof.

10. The method of claim 8 wherein the $C_5$-$C_8$ hydrocarbon is selected from the group consisting of hexane, cyclohexane, octane, toluene, xylenes, and mixtures thereof.

11. The method of claim 8 wherein the solvent is an azeotropic mixture of a $C_5$-$C_8$ hydrocarbon and a $C_1$-$C_{10}$ oxygen-containing compound.

12. The method of claim 11 wherein the solvent is an azeotropic mixture of hexane and ethyl acetate.

13. The method of claim 1 wherein the naphthalene compound is present in an amount from about 5 wt % to about 20 wt % of the solvent.

14. The method of claim 1 which recovers at least 80% of the solvent without causing vessel fouling.

15. The method of claim 1 which recovers at least 90% of the solvent without causing vessel fouling.

* * * * *